United States Patent [19]
Rottenberg

[11] Patent Number: 5,513,234
[45] Date of Patent: Apr. 30, 1996

[54] STRUCTURAL MEMBER FOR NUCLEAR REACTOR PRESSURE TUBES

[76] Inventor: Sigmunt Rottenberg, 11 Riverside Dr., Suite 6KW, New York, N.Y. 60046

[21] Appl. No.: 276,428

[22] Filed: Jul. 18, 1994

[51] Int. Cl.⁶ .................................................. G21C 15/00
[52] U.S. Cl. ............................................ 376/366; 376/462
[58] Field of Search ................................ 376/366, 361, 376/347, 362, 285, 463, 367–380

[56] References Cited

U.S. PATENT DOCUMENTS

| | | | |
|---|---|---|---|
| T937,001 | 8/1975 | Comtois et al. | 376/366 |
| 3,311,540 | 3/1967 | Tower et al. | 376/376 |
| 3,371,016 | 2/1968 | Tower et al. | 376/376 |
| 4,613,477 | 9/1986 | Dableh | 376/366 |
| 5,087,412 | 2/1992 | Bingham et al. | 376/366 |
| 5,171,521 | 12/1992 | Moyer | 376/436 |

Primary Examiner—Daniel D. Wasil

[57] ABSTRACT

The present invention relates to a structural member for nuclear reactor pressure tubes. More particularly, the present invention relates to a new structural member that is used as a beam designed to support the loads and stresses of multiple transversely disposed nuclear reactor fuel channel pressure tubes.

19 Claims, 6 Drawing Sheets

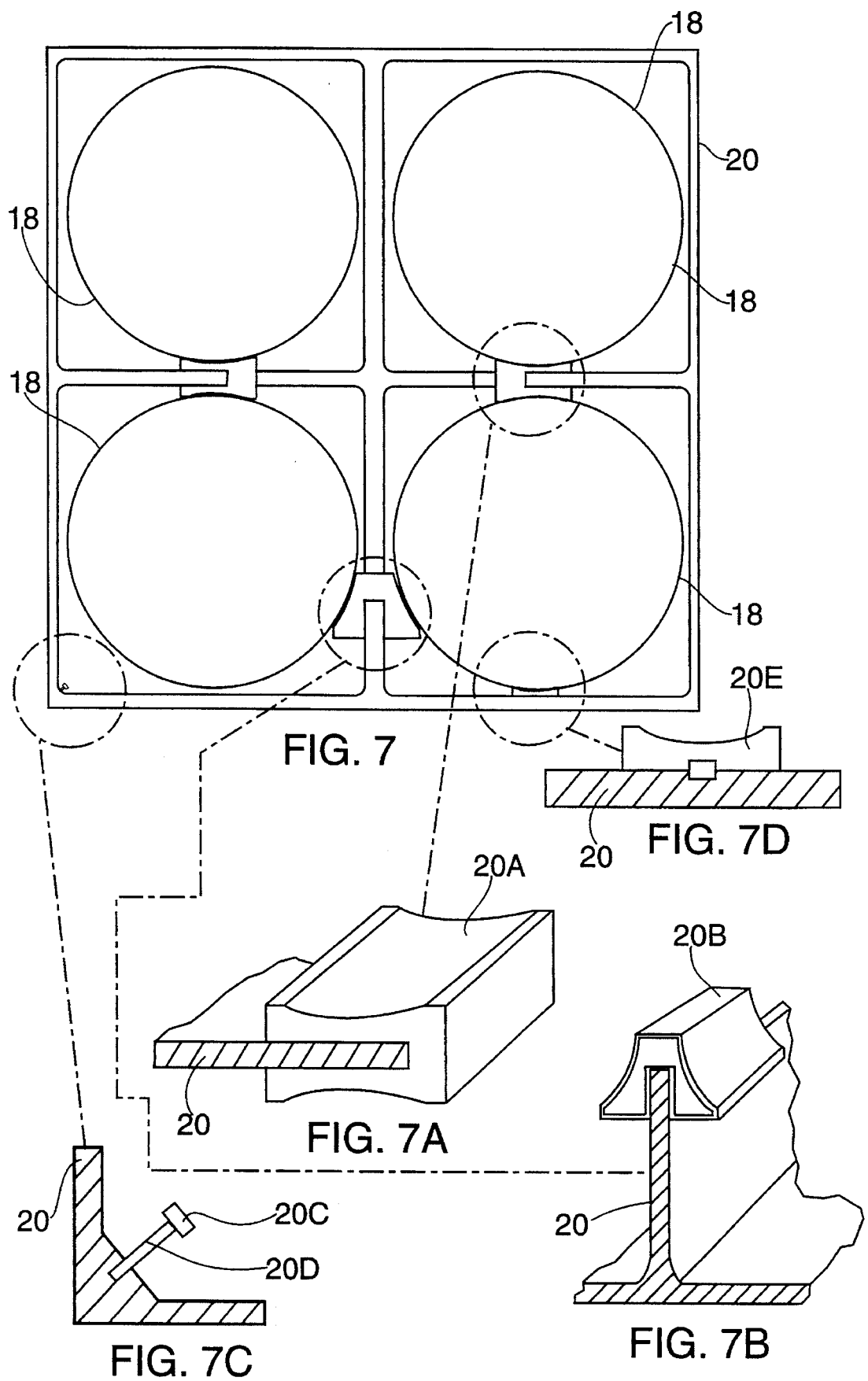

STRUCTURAL MEMBER FOR NUCLEAR REACTOR PRESSURE TUBES

BACKGROUND OF THE INVENTION

1. Field of the Invention

The present invention relates to a structural member for nuclear reactor pressure tubes.

More particularly, the present invention relates to a new structural member that is used as a beam designed to support the loads and stresses of multiple nuclear reactor fuel channel pressure tubes.

2. Description of the Prior Art

Nuclear power plants traditionally have been designed for achieving long term, safe, and reliable performance. To assure safety, the plants incorporate systems and procedures representing a studied anticipation of emergency conditions. Design approaches will have considered theories or premises which may include, for example, design redundancies which are challenged by updated rules of performance as operating experience with nuclear power progresses. Thus, investigators in this power field continuously are called upon to develop improved analytic models of operation exhibiting improved boundings of operational factors and to further achieve higher levels of safety in view of changing rules of safety related performance. Because of the necessarily extensive time interval involved in developing or constructing a new nuclear power facility, for example such an effort may encompass ten years or more, and further in view of the numerous nuclear power facilities now in operation, these investigators typically are called upon to meet new rule criteria by modification of long-existing facilities. Retrofitting procedures can be quite extensive, calling for revised electrical power supplies, major valving replacements, and the like.

The nuclear industry has evolved a variety of reactor types. One such type finding substantial field use performs to produce steam for turbine drive within the reactor core itself and is referred to as a boiling water reactor (BWR). The reactor heated water of the BWR serves not only as working fluid, but also as a reaction moderator, and along with other parameters, its proper supply and application within the system necessarily has been the subject of safety requirements or rule generations by government regulatory agencies such as the Nuclear Regulatory Commission (NRC).

Typically, the general structure of a BWR nuclear system will include an upstanding reactor vessel which incorporates a lower reactor core structure beneath which are control rod drives. Above the core are, in order, a steam separator assembly and a steam dryer assembly leading to a steam outlet. Above the reactor is a shield wall and outwardly of that a drywell. A pressure suppression chamber (wetwell), being torroidal in shape, is located below and encircling the drywell.

In more typical BWR installations, water coolant is heated in the reactor core to rise within the reactor vessel as a two-phase mixture of water and steam. This dual phase mixture then passes upwardly through the steam separator assembly and steam dryer structure to enter the steam line leading to a turbine. Following turbine drive, the steam is condensed to water and returned to the reactor by relatively large condensate and feedwater pumps of a feedwater system. The feedwater enters the downcomer region of the reactor, where it is mixed with the water returning from the steam separator and drying functions. The water in the downcomer region is circulated through the reactor core via the vertically oriented recirculation pumps which direct flow to the vertical jet pumps located between the core shroud and vessel wall (downcomer annulus). In typical fashion, two distinct recirculation loops with corresponding recirculation pumps are employed for this recirculation function.

In the event of some form of breakage or exursion generating malfunction, referred to as a "loss-of-coolant accident" (LOCA), designers anticipate that the relatively higher temperature-higher pressure water within the reactor will commence to be lost. A variety of safety systems and procedures may then be invoked both for containment and for thermal control of this LOCA. For the latter, thermal control, safety designs recognize that, while loss of the water moderator terminates the core reaction to eliminate a possibility of a nuclear incident, the momentum of generated heat or the residual energy within the reactor will remain of such magnitude as to require a cooling control to avoid for example, core melt down. In general, the amount of water within the containment system is more than adequate for this purpose, for example that contained in the suppression pool, or additionally, the condensate storage tank. To apply this water coolant for the safety purpose, a variety of safety related techniques or "emergency core cooling systems" (ECCS) have been developed to accommodate the LOCA. For example, core spray (CS) systems and low pressure coolant injection (LPCI) installations have been evolved in a variety of configurations.

The LPCI system incorporates, for example, four pumps which are activated by a safety system in the event of a coolant loss. Where the loss of coolant is of sufficient extent, and the vessel pressure remains high, for example in the event of a small pipe break then, an automatic safety system will function to depressurize the reactor vessel permitting the relatively lower pressure water supply pumps to operate to introduce water to the reactor. Because the recirculation system earlier described is ideally structured for this purpose, generally it is used by the LPCI system for water introduction under ECCS conditions.

Safety designs heretofore have recognized, however, that a recirculation loop may be broken under a LOCA condition. Thus, the pumping of water into that loop under such a LOCA condition may have no effectiveness. Accordingly, the LPCI systems have been equipped with a recirculation loop selection feature termed "loop selection logic" to avoid such conditions. This safety control detects the broken recirculation loop and initiates a procedure injecting water into the redundant, intact recirculation loop by actuating appropriate LPCI injection valves. Experience with such LPCI loop selection features have shown them to be complex and difficult to test and maintain. Under more current rule-based requirements, the design must accommodate for such occurrences as valve failure and the like. However, to function more effectively under current rules, procedures for retrofitting existing facilities to update them are elaborate and quite expensive, implementation involving such activities as recabling, pump reconnection activities and the like. Thus, an approach has been sought by investigators which offers operators the opportunity to eliminate the requirement for a loop selection logic regimen and associated costs therewith while improving the reliability of the LPCI system.

Numerous innovations for structural member for nuclear reactor pressure tubes have been provided in the prior art that are described as follows. Even though these innovations may be suitable for the specific individual purposes to which they address, they differ from the present invention as hereinafter contrasted.

U.S. Pat. No. 5,213,757

METHOD FOR FIXING A SPRING PACKAGE TO A TOP NOZZLE IN A FUEL ASSEMBLY OF A NUCLEAR POWER REACTOR

LENNART OHMAN

A method of fixing a spring package to a top nozzle in a fuel assembly of a nuclear reactor wherein the fuel assembly comprises fuel rods, guide tubes and spacers arranged in a bundle between a top nozzle and a bottom nozzle wherein a T-shaped slot in milled out in a clamp which is welded to or forms an integral part of the top nozzle for receiving one end of the spring package, the end of the spring package is then inserted into the slot and the end is then fixed in the slot by means of a locking pin.

U.S. Pat. No. 5,213,755

LOW PRESSURE COOLANT INJECTION MODIFICATION FOR BOILING WATER REACTORS

DAVID M. KELLY, ET AL.

A conventional low pressure coolant injection system for boiling water reactors is provided. With the modification, the cross tie conduits and associated valves remain open between two LPCI divisions. On the occasion of an LOCA, the LPCI pumps are activated and injection valves for each of the LPCI divisions are opened to commence coolant injection in the recirculation loops in simultaneous fashion. However, the rate of flow of water coolant within each injection system is controlled by a hydraulic resistance, which is selected to achieve reactor core cooling within requisite quantities from one injection path. Thus, even though coolant water may flow through a rupture within one recirculation loops, sufficient water will be injected in the other loop to achieve core cooling.

U.S. Pat. No. 4,788,033

CALANDRIA

LUCIANO VERONESI

A calandria for use in conducting the hot coolant of a nuclear reactor transversely. The calandria includes an upper plate and a lower plate which support tubes. The plates and tubes are enclosed in a shell which extends above the upper plate and has a supporting flange. The lower plate has holes for transmitting coolant into the region between the plates. The shell has openings whose boundaries mate with the outlet nozzles of the reactor. The tubes are of stainless steel and are dimensioned so that they have mass, stiffness and strength such that they are not subject to failure by the transverse flow of the coolant even at a high velocity.

U.S. Pat. No. 4,788,032

NUCLEAR REACTOR WITH FLOW GUIDANCE IN THE UPPER INTERNALS

JACQUES BAUJAT, ET AL.

A nuclear reactor has a pressure resistant vertical vessel with inlet and outlet pipes situated at the same horizontal level. It also includes internals having a barrel supporting the core and defining with the vessel a down flow path for the coolant from the inlet pipes towards a space under the core and upper internals defining a flow path for the coolant leaving the core, above the latter, and flowing towards the outlet pipes. The upper internals include dividing walls defining circumferentially distributed volumes located at the common level of the pipes and each over a different angular sector. Some volumes belong to the initial part of the downgoing coolant path and the others force part at least of the coolant leaving the core to follow a path which is successively directed upwardly then curving towards the outlet pipes. The invention is particularly suitable for use in pressurized water reactors.

U.S. Pat. No. 4,759,904

PRESSURIZED WATER REACTOR HAVING IMPROVED CALANDRIA ASSEMBLY

JAMES E. GILLET, ET AL.

A calandria assembly is received within the pressure vessel of a nuclear reactor system, at an elevation corresponding to the level of the outlet nozzles of the vessel, and receives pressurized coolant traveling in an axial flow direction within the vessel and turns same to a radial direction for exit though the outlet nozzles. Hollow tubes mounted in parallel relationship at opposite ends to first and second plates of the calandria in conjunction with a cylindrical skirt of cylindrical configuration joining the first and second plates of the calandria, present a redundant structure introducing the potential of thermal stresses, which are limited by selection of the pattern of flow holes in the lower plate and the provision of flexible annular weld joints of J-shaped configuration between the lower ends of the calandria tubes and the lower, second calandria plate.

U.S. Pat. No. 4,284,475

WEAR SLEEVE FOR CONTROL ROD GUIDE TUBE

ANDREW J. ANTHONY

A wear sleeve for a guide tube in a nuclear fuel assembly, and a method of installing the sleeve. The sleeve is an elongated metal cylinder having an upper portion adapted to be suspended from the upper end of the guide tube, and a lower portion adapted to be permanently deformed into interference fit with the walls of the guide tube whereby the sleeve may be secured against vertical movement. The method of installing the sleeve includes the steps of suspending the sleeve from the upper end of the guide tube, then expanding a selected lower surface of the sleeve until the sleeve is permanently deformed, whereby an interference fit between the sleeve and tube is formed.

Numerous innovations for structural member for nuclear reactor pressure robes have been provided in the prior an that are adapted to be used. Even though these innovations may be suitable for the specific individual purposes to which they address, they would not be suitable for the purposes of the present invention as heretofore described.

SUMMARY OF THE INVENTION

The present invention is addressed to a structural member for nuclear reactor pressure tubes and method which provides effective insertion of water coolant within the recirculating loops of conventional boiling water reactors, but without resorting to complex loop selection logic. Through analysis by modeling and the like of the requirements of the a structural member for nuclear reactor pressure tubes in terms of time for complete coolant injection and in terms of the required quantity of injected fluid, flow rates of injection are derived and requisite quantities of coolant are determined and identified such that the a structural member for nuclear reactor pressure tubes process is controlled through the simple approach of utilizing flow rate controlling hydraulic resistance within coolant injection conduits. Those hydraulic resistances may be implemented with a conventional orifice, the size and shape of which determines desired flow rates or by the throttling of a valve within the injection conduit achieving the equivalent result. Under the process, cross tie conduits and associated cross tie valving otherwise used for recirculation loop selection for coolant injection are not activated, but merely remain in an open condition. Under the new method and system, necessary a structural member for nuclear reactor pressure tubes modifications are achieved without resort to the complicated system and instrumentation otherwise required for loop selection with a minimum of hardware perturbation, rewiring or repiping.

As another feature, the invention provides a structural member for nuclear reactor pressure tubes having a low pressure coolant injection system for a nuclear power facility of a variety having a boiling water reactor, having a reactor core and normal operating pressure, first and second recirculation loops including respective first and second recirculation pumps and actuable discharge valves, a suppression pool water source, a condensate storage tank, and a safety system responsive to a loss-of-coolant accident to generate a safety output. The system includes first and second low pressure coolant injection pumps having suction inputs and discharge outputs and actuable to pump water. A supply conduit arrangement is provided for coupling the suction inputs of the first and second low pressure coolant injection pumps in fluid flow communication with the suppression pool. First and second coolant injection conduits are provided which are coupled with respective discharge outputs of the first and second low pressure coolant injection pumps and to respective first and second recirculation loops. First and second hydraulic resistance components within respective first and second coolant injection conduits are provided for restricting the flow of water coolant therein to a predetermined fluid rate selected to deliver a predetermined quantity of water coolant to each of the first and second recirculation loops, the flow rates being selected as effective for carrying out the emergency cooling of the reactor core from one coolant injection conduit. A control arrangement is provided which is responsive to the safety output for actuating the first and second low pressure coolant injection pumps.

As another feature, the invention provides a method for injecting low pressure cooling water into the boiling water reactor of a nuclear power facility having a source of emergency core cooling water, first and second independent recirculation loops normally circulating water through the core of the reactor for steam generation and a safety system responsive to a loss-of-coolant accident to generate a safety output for effecting the supply of at least a predetermined quantity of water coolant to the reactor, comprising the steps of: providing first and second water flow paths from the source of water coolant to respective first and second recirculation loops; providing low pressure coolant injection pumps actuable or pumping water from the source through the first and second water flow paths; providing a valve arrangement actuable from a closed to an open condition for effecting flow within the first and second water flow path actuating the valve arrangement in response to the safety output to permit water coolant flow simultaneously in each first and second water flow path; actuating the low pressure coolant injection pumps in response to the safety output; and restricting the flow of the water coolant in each first and second water flow path to a predetermined fluid flow rate selected to deliver the predetermined quantity of water coolant to each respective first and second independent recirculation loops, said flow rate being selected as effective for carrying out the emergency cooling of the reactor core from one water flow path.

As another feature, the invention provides a low pressure coolant injection system for a nuclear power facility of a variety having a boiling water reactor with a reactor core, and normal operating pressure, first and second recirculation loops including respective first and second recirculation pumps and actuable discharge valves, a suppression pool water source, a condensate storage tank, and a safety system responsive to a loss-of-coolant accident to generate a safety output. The system includes first and second low pressure coolant injection pumps having suction inputs and discharge outputs and actuable to pump water. A supply conduit arrangement is provided for coupling the suction inputs of the first and second low pressure coolant injection pimps in fluid flow communication with the suppression pool and further includes a cross tie conduit arrangement for selectively interconnecting the discharge outputs of the first and second low pressure coolant injection pumps. First and second coolant injection conduits are provided which are coupled with respective discharge outputs of the first and second low pressure coolant injection pumps and to respective first and second recirculation loops. First and second low pressure coolant injection valves are provided within respective first and second coolant injection conduits and are actuable between closed and open orientations. Further provided are first and second hydraulic resistance devices within respective first and second coolant injection conduits for restricting the flow of water coolant therein to a predetermined fluid rate selected to deliver a predetermined quantity of water to each of the first and second recirculation loops, the flow rate being selected as effective for carrying out the emergency cooling of the reactor core from one coolant injection conduit. A cross tie valve arrangement is provided within the cross tie conduit which is actuable between open and closed conditions for selectively directing the outputs of the first and second low pressure coolant injection pumps to one of the first and second recirculation loops through select first and second coolant injection conduits. A control arrangement is provided which is responsive to the safety output for actuating the first and second low pressure coolant injection pumps, the first and second low pressure coolant injection valves and retaining the cross tie arrangement in the open condition in the presence of the safety output.

The invention, accordingly, comprises the system and method possessing the construction, combination of elements, arrangement of parts and steps which are exemplified in the following description.

Accordingly, it is an object of the present invention to provide a new structural member with metal fuel channel pressure tubes that reduce moment, reaction and deflection stresses at the ends of the metal pressure tubes.

More particularly, it is an object of the present invention to provide a new structural member that will reduce the incidence of cracks developing in the metal of the fuel channel pressure tubes. The new structural member with ceramic fuel channel pressure tubes reduces moment, reaction and deflection stresses at the end of the ceramic pressure tube. The ceramic pressure tube is not affected by irradiation and growth of its diameter as the metal tube is.

In keeping with these objects, and with others which will become apparent hereinafter, one feature of the present invention resides, briefly stated, in the ability to use ceramics instead of metal as the pressure tubes.

When the structural member for nuclear reactor pressure tubes is designed in accordance with the present invention, stress of the pressure tube is greatly reduced, if not eliminated.

In accordance with another feature of the present invention, the invention provides for the use of ceramic pressure tubes by providing full length support without deflection for ceramic brittle material.

Another feature of the present invention is that the new structural member would be made to house four, six or eight, etc. pressure tubes within it. The new structural member would act as a Calandria for all the pressure tubes within. The advantage would be that the new structural member would act as a unit that would have its own controls as to the flow of gas or heavy water. It could be taken out of service for maintenance or pressure tube replacement, while the reactor would remain in operation.

Yet another feature of the present invention is the support pads which cradle the pressure tubes and prevent sideways movement of the tube.

Accordingly, it is a general object of the present invention to provide the reduction of stresses in Calandria and pressure tubes.

It is a more particular object of the present invention to provide continuous and intermittent support for the pressure tubes.

An object of the present invention is to provide the prevention of cracks in the pressure tubes.

A further object of the present invention is to eliminate deflection and sag in Calandria and pressure tubes.

A still further object of the invention is to provide the use of materials for pressure tubes that withstand irradiation, high temperatures, etc (ceramic).

A further object of the present invention is to allow for replacement of pressure tubes without shutting down the reactor.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

11—interior robe cavity 11
12—new structural member tubes 12
14—Calandria tube 14
15—cylindrical air space 15
16—support pads 16
16A—support pad 16A
16B—intermediate bracing pad 16B
18—fuel channel pressure tube 18
20—four pressure tube structural member 20
20A—four pressure tube structural member center wall horizontal support 20A
20B—four pressure tube structural member center wall vertical support 20B
20C—four pressure tube structural member corner support 20C
20D—four pressure tube structural member corner support brace 20D
20E—four pressure tube structural member bottom support 20E
22—steel plate or web 22
22A—steel plate or web support pad 22A
22B—steel plate or web bolts 22B
22C—steel plate or web holes in steel plate or web 22C
24—strap with bolt 24

DETAILED LIST OF REFERENCE NUMERALS UTILIZED IN THE DRAWING

11—interior tube cavity 11 of the Calandria tube 14
12—new structural member tubes 12 used as beam designed to support loads and stresses with minimal deflection of the Calandria tube 14 and fuel channel pressure tube 18
14—Calandria tube 14 surrounding the fuel channel pressure tube 18 for support and structural strength
15—cylindrical air space 15 allowing flexible movement of the fuel channel pressure tube 18 within the Calandria tube 14
16—support pads 16 to support and cushion the fuel channel pressure tube 18 within the Calandria tube 14
A—support pad 16A supporting the bottom of the fuel channel pressure tube 18 within the Calandria tube 14
16B—intermediate bracing pad 16B supporting the side walls of the fuel channel pressure tube 18 within the Calandria tube 14
18—fuel channel pressure tube 18 inside of the Calandria tube 14 holding the nuclear fuel for the reactor
20—four pressure tube structural member 20 holding four fuel channel pressure tubes 18 within the Calandria tubes 14
20A—center wall horizontal support 20A supporting the upper fuel channel pressure tube 18 and the lower fuel channel pressure tube 18 within the four pressure tube structural member 20 restricting vertical movement of the fuel channel pressure tubes 18
20B—center wall vertical support 20B supporting the left fuel channel pressure tube 18 and the right fuel channel pressure tube 18 within the four pressure tube structural member 20 restricting horizontal movement of the fuel channel pressure tubes 18
20C—corner support 20C supporting the each of the fuel channel pressure tubes 18 within the four pressure tube structural member 20 restricting rotational movement of the fuel channel pressure tubes 18
20D—corner support brace 20D supporting the corner support 20C in order to support the fuel channel pressure tubes 18
20E—bottom support 20E supporting the lower fuel channel pressure tubes 18 within the four pressure tube structural member 20 restricting vertical movement of the fuel channel pressure tubes 18
22—steel plate or web 22 between two fuel channel pressure tubes 18 to give support and flexible strength to the fuel channel pressure tubes 18 surrounding the Calandria tubes 14
22A—steel plate or web support pad 22A supporting the upper fuel channel pressure tubes 18 within the new structural member tubes 12 restricting vertical movement of the fuel channel pressure tubes 18 as part of the steel plate or web 22

22B—bolts 22B attaching the Calandria tubes 14 to the steel plate or web 22

22C—holes in steel plate or web 22C allows flexibility of the Calandria tubes 14

24—strap with bolt 24 attaching the Calandria tubes 14 to the steel plate or web 22

BRIEF DESCRIPTION OF THE PREFERRED EMBODIMENT

FIG. 1 is a cross sectional view of the new structural member and pressure tubes FIG. 2 is a cross sectional view of the new structural member and pressure tubes along with a side view of the pressure tubes and web FIG. 3 is a cross sectional view of the new structural members inside of the nuclear reactor FIG. 4 is a second cross sectional view of the new structural members inside of the nuclear reactor FIG. 5 is a cross sectional view of the new structural member and pressure tubes showing the side bolts FIG. 6 is a cross sectional view of the new structural members showing four pressure tube structure FIG. 7 is a cross sectional view of the new structural members with various detail showing four pressure tube structure with support details FIG. 7A is a detail view of the center wall horizontal support inside of the cross sectional view of the new structural members with four pressure tube structure FIG. 7B is a detail view of the center wall vertical support inside of the cross sectional view of the new structural members with four pressure tube structure FIG. 7C is a detail view of the center wall corner support inside of the cross sectional view of the new structural members with four pressure tube structure FIG. 7D is a detail view of the center wall bottom support inside of the cross sectional view of the new structural members with four pressure tube structure

DETAILED DESCRIPTION OF THE PREFERRED EMBODIMENT

Figure 1:
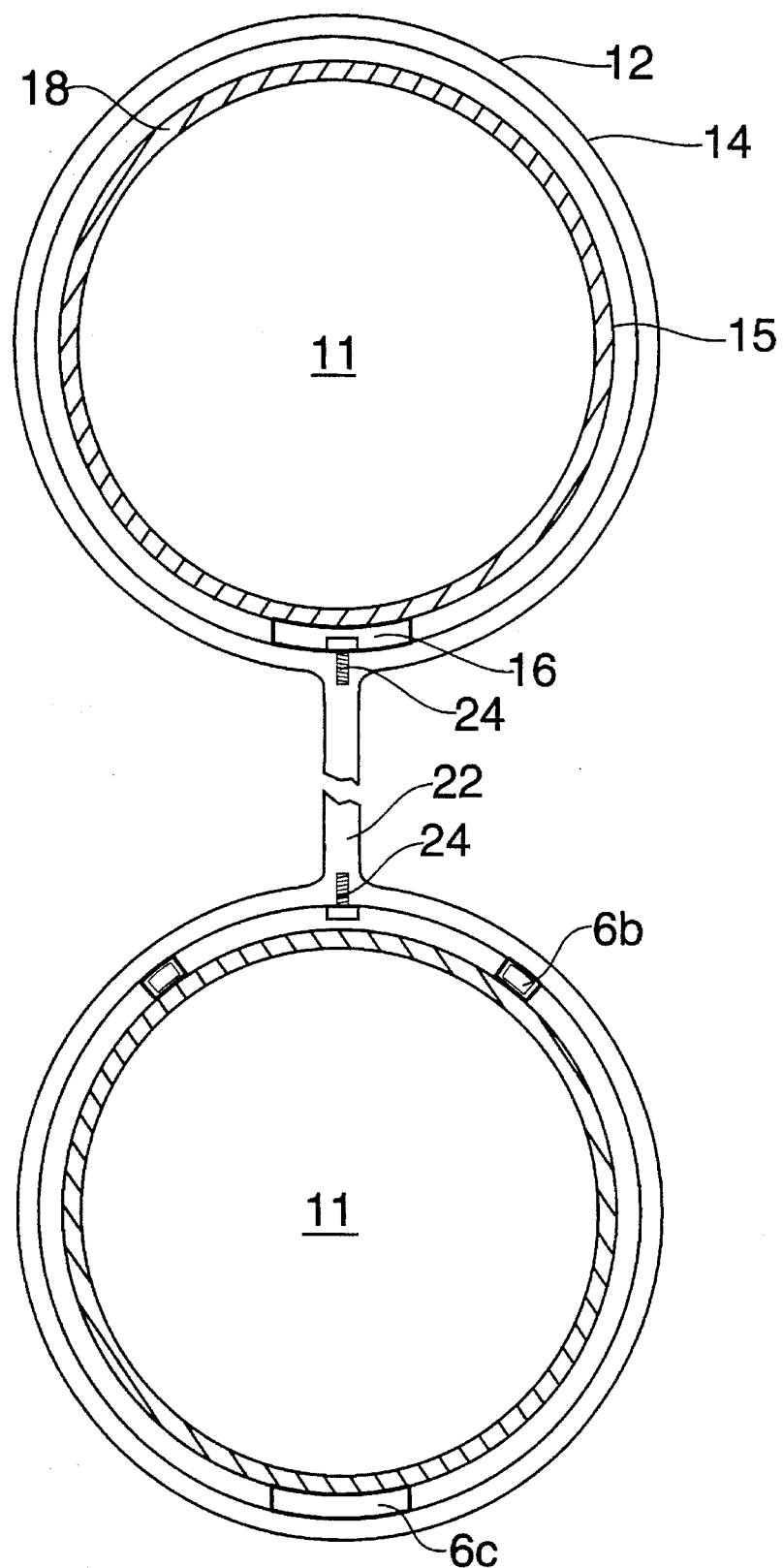

Firstly, referring to FIG. 1, which is a cross sectional view of the new structural member and pressure tubes exhibiting the following features: interior tube cavity 11 of the Calandria tube 14; new structural member tubes 12 used as beam designed to support loads and stresses with minimal deflection of the Calandria tube 14 and fuel channel pressure tube 18; Calandria tube 14 surrounding the fuel channel pressure tube 18 for support and structural strength; cylindrical air space 15 allowing flexible movement of the fuel channel pressure tube 18 within the Calandria tube 14; support pads 16 to support and cushion the fuel channel pressure tube 18 within the Calandria tube 14; support pad 16A supporting the bottom of the fuel channel pressure tube 18 within the Calandria tube 14; intermediate bracing pad 16B supporting the side walls of the fuel channel pressure tube 18 within the Calandria tube 14; fuel channel pressure tube 18 inside of the Calandria tube 14 holding the nuclear fuel for the reactor; steel plate or web 22 between two fuel channel pressure tubes 18 to give support and flexible strength to the fuel channel pressure tubes 18 surrounding the Calandria tubes 14; strap with bolt 24 attaching the Calandria tubes 14 to the steel plate or web 22.

Figure 2:
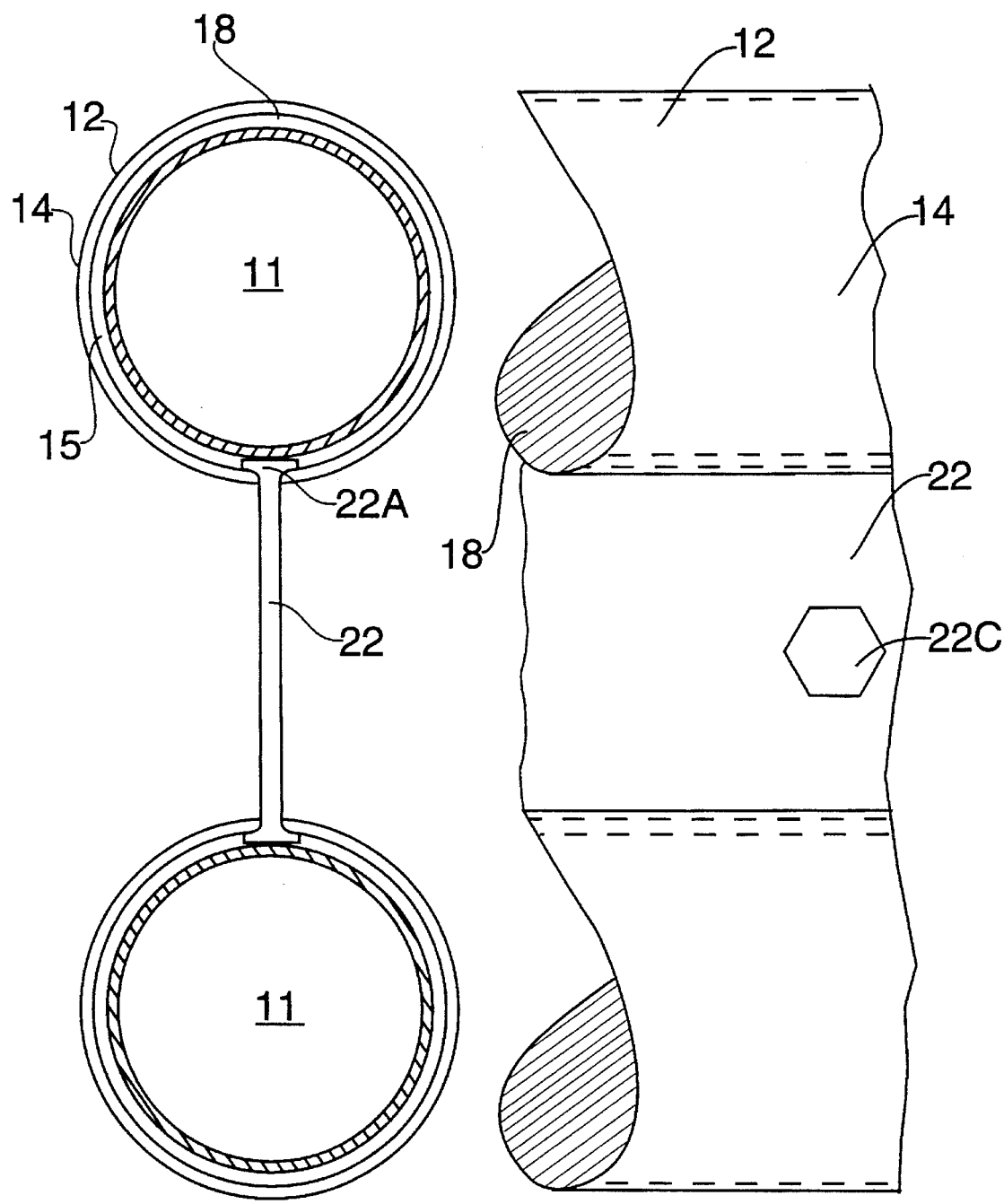

Now, referring to FIG. 2 which is a cross sectional view of the new structural member and pressure tubes along with a side view of the pressure tubes and web exhibiting the following features: interior tube cavity 11 of the Calandria tube 14; new structural member tubes 12 used as beam designed to support loads and stresses with minimal deflection of the Calandria tube 14 and fuel channel pressure tube 18; Calandria tube 14 surrounding the fuel channel pressure tube 18 for support and structural strength; cylindrical air space 15 allowing flexible movement of the fuel channel pressure tube 18 within the Calandria tube 14; fuel channel pressure tube 18 inside of the Calandria tube 14 holding the nuclear fuel for the reactor; steel plate or web 22 between two fuel channel pressure tubes 18 to give support and flexible strength to the fuel channel pressure tubes 18 surrounding the Calandria tubes 14; steel plate or web support pad 22A supporting the upper fuel channel pressure tubes 18 within the new structural member tubes 12 restricting vertical movement of the fuel channel pressure tubes 18 as part of the steel plate or web 22; holes in steel plate or web 22C allows flexibility of the Calandria tubes 14.

Figure 3:
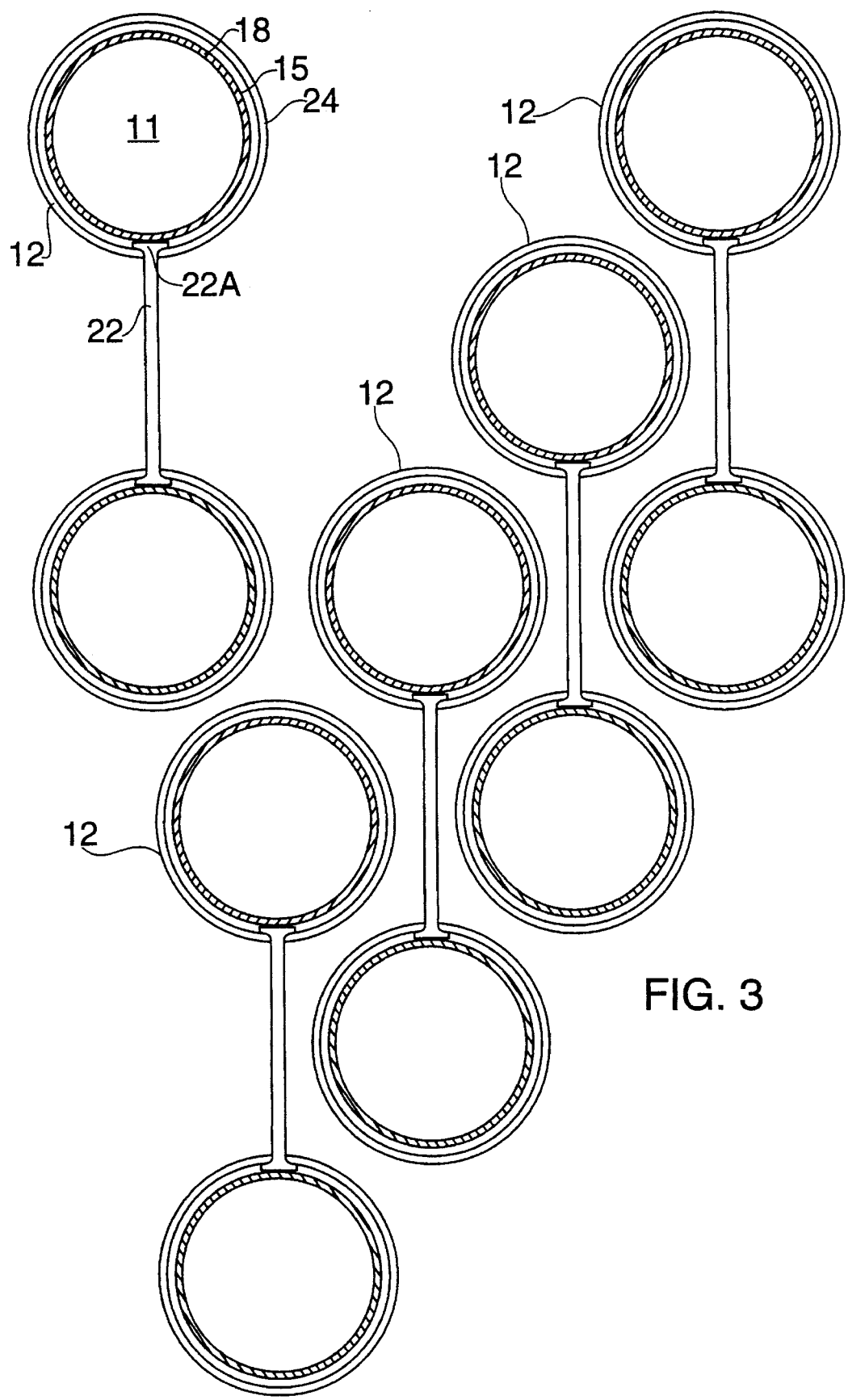

Now, referring to FIG. 3, which is a cross sectional view of the new structural members inside of the nuclear reactor exhibiting the following features: interior tube cavity 11 of the Calandria tube 14; new structural member tubes 12 used as beam designed to support loads and stresses with minimal deflection of the Calandria tube 14 and fuel channel pressure tube 18; Calandria tube 14 surrounding the fuel channel pressure tube 18 for support and structural strength; cylindrical air space 15 allowing flexible movement of the fuel channel pressure tube 18 within the Calandria tube 14; fuel channel pressure tube 18 inside of the Calandria tube 14 holding the nuclear fuel for the reactor; steel plate or web 22 between two fuel channel pressure tubes 18 to give support and flexible strength to the fuel channel pressure tubes 18 surrounding the Calandria tubes 14; steel plate or web support pad 22A supporting the upper fuel channel pressure tubes 18 within the new structural member tubes 12 restricting vertical movement of the fuel channel pressure tubes 18 as part of the steel plate or web 22.

Figure 4:
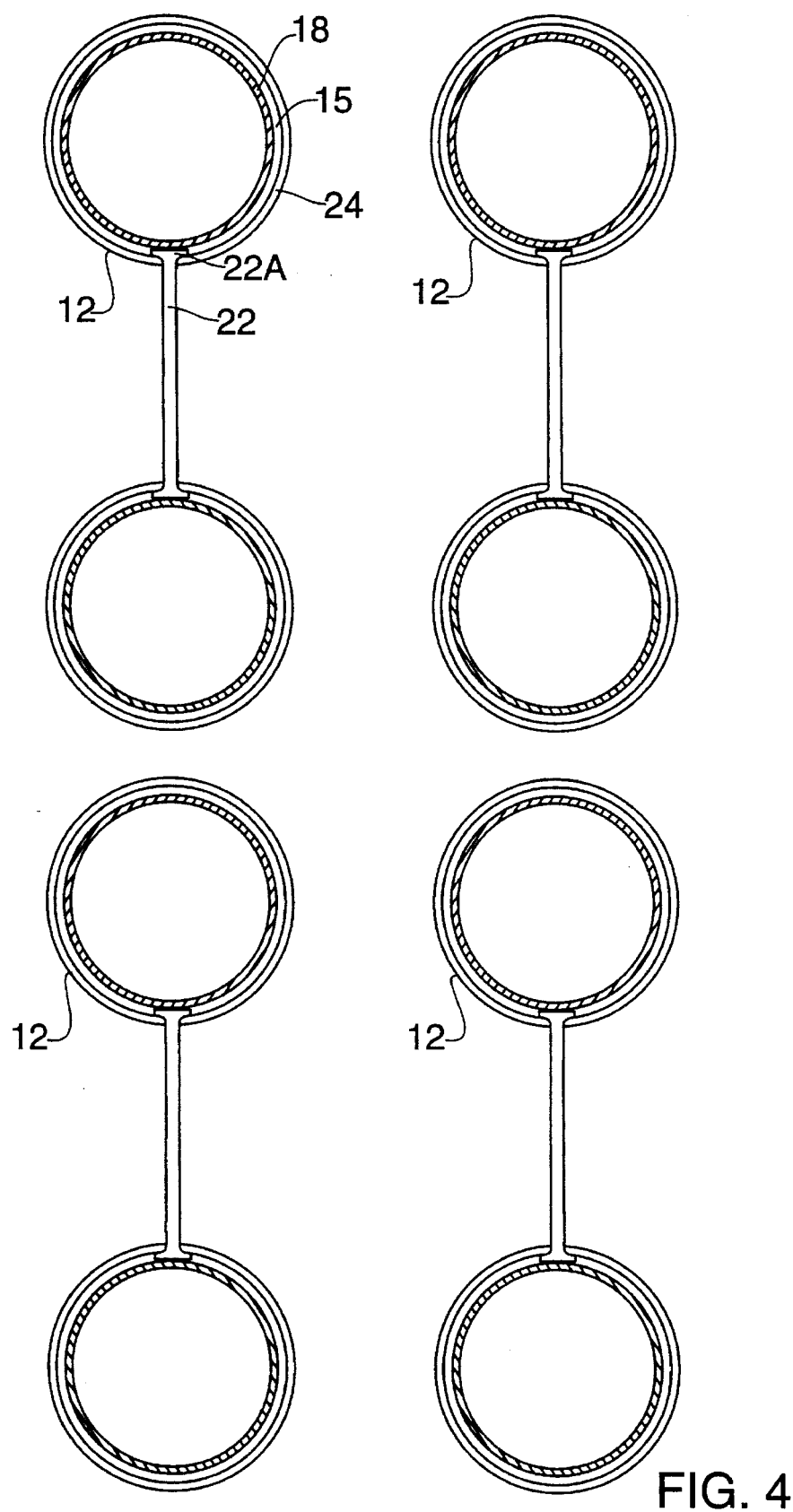

Now, referring to FIG. 4, which is a second cross sectional view of the new structural members inside of the nuclear reactor exhibiting the following features: interior tube cavity 11 of the Calandria tube 14; new structural member tubes 12 used as beam designed to support loads and stresses with minimal deflection of the Calandria tube 14 and fuel channel pressure tube 18; Calandria tube 14 surrounding the fuel channel pressure tube 18 for support and structural strength; cylindrical air space 15 allowing flexible movement of the fuel channel pressure tube 18 within the Calandria tube 14; fuel channel pressure tube 18 inside of the Calandria tube 14 holding the nuclear fuel for the reactor; steel plate or web 22 between two fuel channel pressure tubes 18 to give support and flexible strength to the fuel channel pressure tubes 18 surrounding the Calandria tubes 14; steel plate or web support pad 22A supporting the upper fuel channel pressure tubes 18 within the new structural member tubes 12 restricting vertical movement of the fuel channel pressure tubes 18 as part of the steel plate or web 22.

Figure 5:
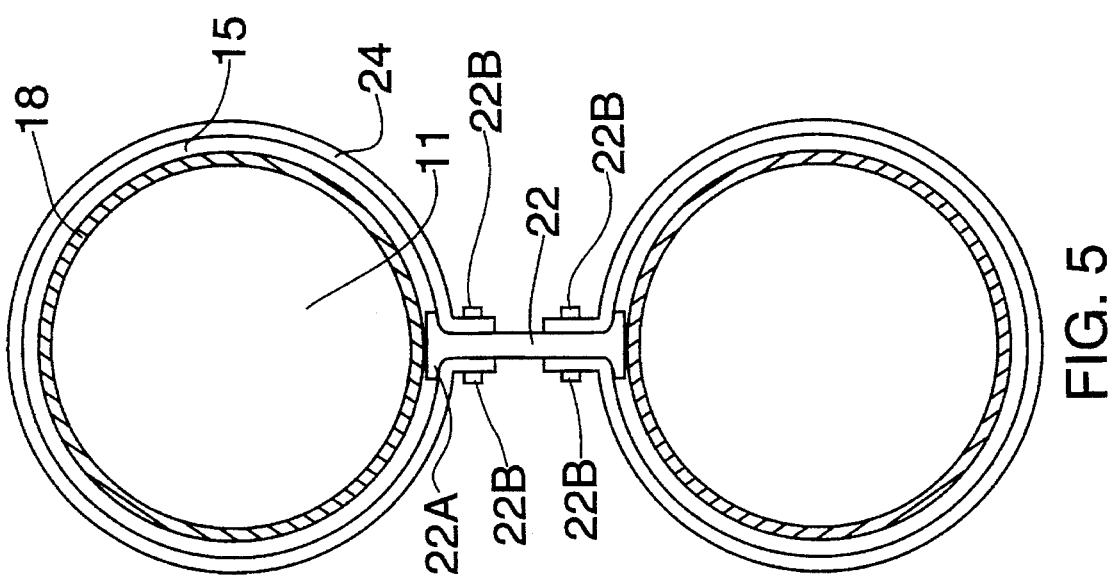

Now, referring to FIG. 5, which is a cross sectional view of the new structural member and pressure tubes showing the side bolts exhibiting the following features: interior tube cavity 11 of the Calandria tube 14; new structural member tubes 12 used as beam designed to support loads and stresses with minimal deflection of the Calandria tube 14 and fuel channel pressure tube 18; Calandria tube 14 surrounding the fuel channel pressure tube 18 for support and structural strength; cylindrical air space 15 allowing flexible movement of the fuel channel pressure tube 18 within the Calandria tube 14; fuel channel pressure tube 18 inside of the Calandria tube 14 holding the nuclear fuel for the reactor; steel plate or web 22 between two fuel channel pressure tubes 18 to give support and flexible strength to the fuel channel pressure tubes 18 surrounding the Calandria tubes 14; steel plate or web support pad 22A supporting the upper fuel channel pressure tubes 18 within the new structural member tubes 12 restricting vertical movement of the fuel channel pressure tubes 18 as part of the steel plate or web 22; steel plate or web bolts 22B attaching the Calandria tubes 14 to the steel plate or web 22.

Figure 6:
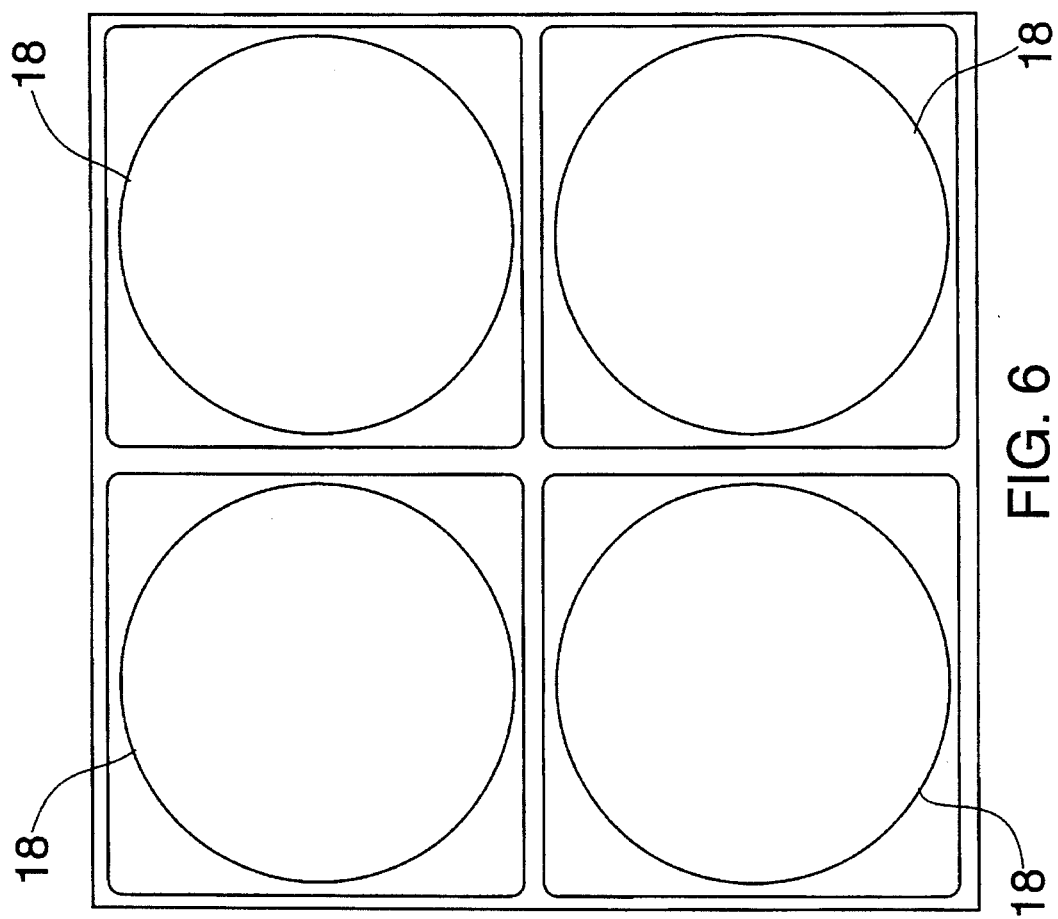

Now, referring to FIG. 6, which is a cross sectional view of the new structural members showing four pressure tube structure exhibiting the following features: fuel channel pressure tube 18 inside of the Calandria tube 14 holding the nuclear fuel for the reactor; four pressure tube structural member 20 holding four fuel channel pressure tubes 18 within the Calandria tubes 14.

Now, referring to FIG. 7, which is a cross sectional view of the new structural members with various detail showing four pressure tube structure with support details exhibiting the following features: fuel channel pressure tube 18 inside of the Calandria tube 14 holding the nuclear fuel for the reactor; four pressure tube structural member 20 holding four fuel channel pressure tubes 18 within the Calandria tubes 14.

Now, referring to FIG. 7A, which is a detail view of the center wall horizontal support inside of the cross sectional view of the new structural members with four pressure tube structure exhibiting the following features: four pressure tube structural member 20 holding four fuel channel pressure tubes 18 within the Calandria tubes 14; four pressure tube structural member center wall horizontal support 20A supporting the upper fuel channel pressure tube 18 and the lower fuel channel pressure tube 18 within the four pressure tube structural member 20 restricting vertical movement of the fuel channel pressure tubes 18.

Now, referring to FIG. 7B, which is a detail view of the center wall vertical support inside of the cross sectional view of the new structural members with four pressure tube structure exhibiting the following features: four pressure tube structural member 20 holding four fuel channel pressure tubes 18 within the Calandria tubes 14; four pressure tube structural member center wall vertical support 20B supporting the left fuel channel pressure tube 18 and the right fuel channel pressure tube 18 within the four pressure tube structural member 20 restricting horizontal movement of the fuel.

Now, referring to FIG. 7C, which is a detail view of the center wall corner support inside of the cross sectional view of the new structural members with four pressure tube structure exhibiting the following features: four pressure tube structural member 20 holding four fuel channel pressure tubes 18 within the Calandria tubes 14; four pressure tube structural member corner support 20C supporting the each of the fuel channel pressure tubes 18 within the four pressure tube structural member 20 restricting rotational movement of the fuel channel pressure tubes 18; four pressure tube structural member corner support brace 20D supporting the four pressure tube structural member corner support 20C in order to support the fuel channel pressure tubes 18.

Lastly, referring to FIG. 7D, which is a detail view of the center wall bottom support inside of the cross sectional view of the new structural members with four pressure tube structure exhibiting the following features: four pressure tube structural member 20 holding four fuel channel pressure tubes 18 within the Calandria tubes 14; four pressure tube structural member corner support brace 20D supporting the four pressure tube structural member corner support 20C in order to support the fuel channel pressure tubes 18.

It will be understood that each of the elements described above, or two or more together, may also find a useful application in other types of constructions differing from the type described above.

While the invention has been illustrated and described as embodied in a structural member for nuclear reactor pressure tubes, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for supporting multiple transversely disposed nuclear reactor fuel channel pressure tubes, comprising:

a) a first tube shaped portion having a length;

b) a second tube shaped portion having a length;

c) a web connecting said first tube shaped portion to said second tube shaped portion; and d) a plurality of support pads disposed internally to said first tube shaped portion and said second tube shaped portion, said plurality of support pads extending said length of said first tube shaped portion and said length of said second tube shaped portion, said plurality of support pads forming an air space between each fuel channel pressure tube and said first tube shaped portion and said second tube shaped portion, said first tube shaped portion and said second tube shaped portion defining and functioning as an outer calandria tube for said each fuel pressure tube so that said each fuel channel pressure tube is protected against sags caused by gravity and ultimate cracks and said air space providing conduits for coolant.

2. The apparatus as defined in claim 1, wherein said first tube shaped portion, said second tube shaped portion, said plurality of support pads, and said web are integrally formed.

3. The apparatus as defined in claim 1, wherein said first tube shaped portion, said second tube shaped portion, and said web are integrally formed.

4. The apparatus as defined in claim 1, wherein said plurality of support pads include side support pads and web support pads.

5. The apparatus as defined in claim 4, wherein said web and said web support pads are integrally formed.

6. The apparatus as defined in claim 4, wherein said first tube shaped portion, said second tube shaped portion, and said web support pads are integrally formed.-

7. The apparatus as defined in claim 1, wherein said first tube shaped portion, said second tube shaped portion, said plurality of support pads, and said web are manufactured from metal.

8. The apparatus as defined in claim 1, wherein said first tube shaped portion, said second tube shaped portion, said plurality of support pads, and said web are manufactured from fiberglass.

9. The apparatus as defined in claim 1, wherein said first tube shaped portion, said second tube shaped portion, said plurality of support pads, and said web are manufactured from plastic.

10. An apparatus for supporting multiple transversely disposed nuclear reactor fuel channel pressure tubes, comprising:

a) a hollow outer shell having a length;

b) a sideward partitioning wall disposed internal to said hollow outer shell and having a length;

c) an upward partitioning wall disposed internal to said hollow outer shell and having a length, said upward partitioning wall forming in conjunction with said sideward partitioning wall a criss cross configuration, said criss cross configuration and said hollow outer shell defining a plurality of closed chambers; and d) a plurality of support pads disposed internally to said hollow outer shell, said plurality of support pads extending said length of said hollow outer shell and said length of said sideward partitioning wall and said length of said upward partitioning wall, said plurality of support pads supporting a fuel channel pressure tube contained within each of said plurality of closed chambers and forming an air space between each said fuel channel pressure tube and said outer shell and said criss cross configuration of said sideward partitioning wall and said upward partitioning wall, said outer shell in conjunction with said upward partitioning wail and said sideward partitioning wall defining and functioning as an outer calandria tube for said each said fuel channel pressure tube so that said each said fuel channel pressure tube is protected against sags caused by gravity and ultimate cracks and said air space providing conduits for coolant.

11. The apparatus as defined in claim 10, wherein said hollow outer shell, said sideward partitioning wall, said upward partitioning wall, and said plurality of support pads are integrally formed.

12. The apparatus as defined in claim 10, wherein said hollow outer shell, said sideward partitioning wall, and said upward partitioning wall are integrally formed.

13. The apparatus as defined in claim 10, wherein said plurality of support pads include hollow outer shell pads, hollow outer shell corner pads, sideward partitioning wall pads, and upward partitioning wall pads.

14. The apparatus as defined in claim 13, wherein said hollow outer shell, said hollow outer shell pads, and said hollow outer shell corner pads are integrally formed.

15. The apparatus as defined in claim 13, wherein said sideward partitioning wall and said sideward partitioning wall pads are integrally formed.

16. The apparatus as defined in claim 13, wherein said upward partitioning wall and said upward partitioning wall pads ,are integrally formed.

17. The apparatus as defined in claim 10, wherein said hollow outer shell, said sideward partitioning wall, said upward partitioning wall, and said plurality of support pads are manufactured from metal.

18. The apparatus as defined in claim 10, wherein said hollow outer shell, said sideward partitioning wall, said upward partitioning wall, and said plurality of support pads are manufactured from plastic.

19. The apparatus as defined in claim 10, wherein said hollow outer shell, said sideward partitioning wall, said upward partitioning wall, and said plurality of support pads are manufactured from fiberglass.

* * * * *